United States Patent [19]

Iwase

[11] 4,195,387
[45] Apr. 1, 1980

[54] HORIZONTAL FISH KIDNEY-REMOVING MACHINE

[75] Inventor: Shigeo Iwase, Hakodate, Japan

[73] Assignee: Taiyo Seisakusho Manufacturing Co., Ltd., Hakodate, Japan

[21] Appl. No.: 965,988

[22] Filed: Dec. 4, 1978

[30] Foreign Application Priority Data

May 29, 1978 [JP] Japan .................. 53-63393

[51] Int. Cl.² .......................................... A22C 25/14
[52] U.S. Cl. ........................................................ 17/58
[58] Field of Search .............................. 17/58, 55, 65

[56] References Cited

U.S. PATENT DOCUMENTS

| 2,955,316 | 10/1960 | Danielsson | 17/55 X |
| 3,546,738 | 12/1970 | Heck | 17/58 X |

Primary Examiner—Willie G. Abercrombie
Attorney, Agent, or Firm—George B. Oujevolk

[57] ABSTRACT

There is disclosed a horizontal fish kidney-removing machine which is adapted to mechanically remove the kidney of salmon or trout, the machine comprising a pair of conveyor belts provided at a distance in a vertical direction, a kidney-removing member disposed between the pair of conveyor belts, the removing member being composed of two flat plates which are combined by welding at both ends in boat-shaped forms each gradually diverging from the end to establish a space of a rectangular form at the central portion thereof, an inclining guide plate disposed upstream of the removing member and fixedly secured to an upper end of an induction plate, a plurality of injector nozzles disposed in the rectangularly-shaped space to inject a pressurized fluid therefrom so as to automatically wash out the kidney attached to the inner walls of the body of the salmon or trout, and a keep plate disposed opposingly to the injector nozzles to prevent the salmon or trout being fed with the conveyor belts from running out or escaping.

3 Claims, 8 Drawing Figures

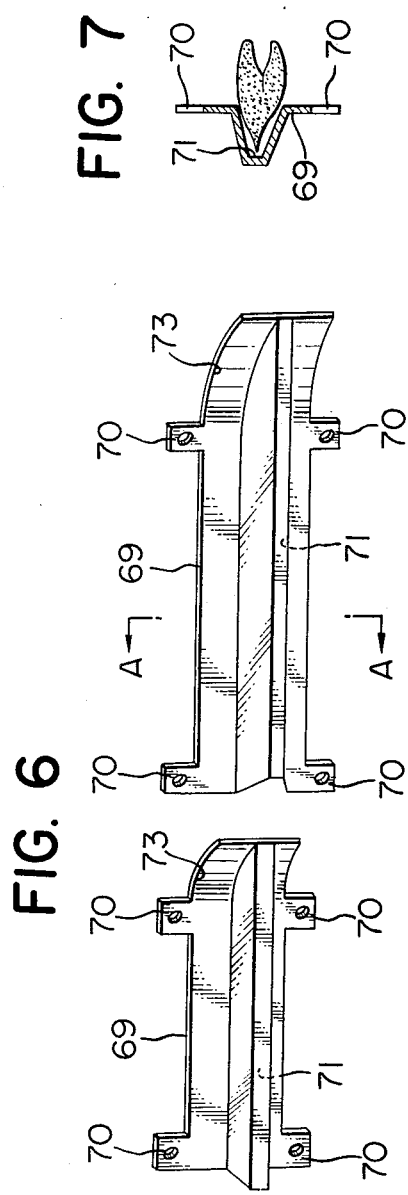
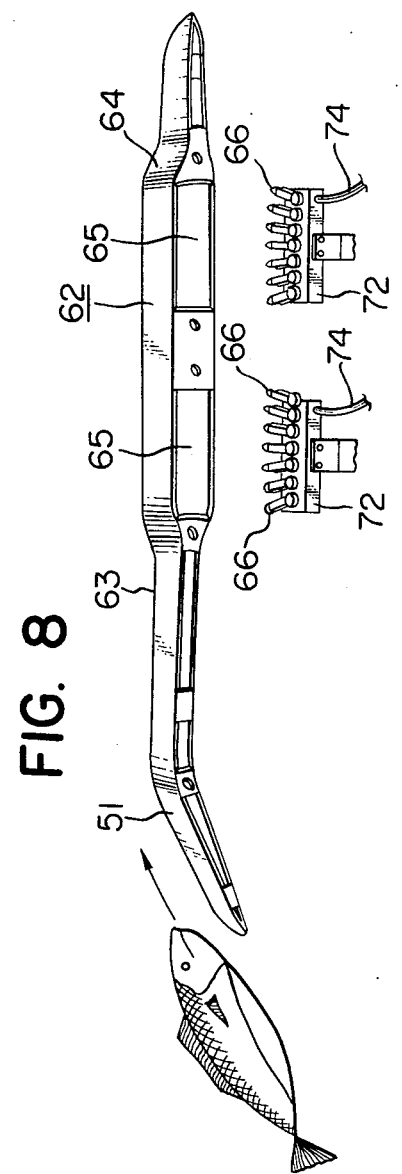

HORIZONTAL FISH KIDNEY-REMOVING MACHINE

BACKGROUND OF THE INVENTION

1. Field of the Invention

This invention relates to a horizontal salmon's or trout's kidney-removing machine which comprises a pair of conveyor belts disposed at a distance in a vertical direction, a kidney-removing member interposed between the pair of conveyor belts, an inclining guide plate disposed upstream of the kidney-removing member, a pair of induction plates mounted on a table at the feed side (or inlet side), one of the induction plates fixedly securing the guide plate thereto at an upper end thereof, an injector element having a plurality of nozzles, the injector element being mounted in the space of a rectangular form established at the central portion of the kidney-removing member, pairs of belt tension-adjusting units provided at the central region of the belts and adapted to have the belts tensioned, further pairs of belt tension-adjusting devices disposed near a guide pulley and a drive pulley located at front and rear sides of the machine, respectively and a keep plate formed with a recessed portion at the center line along its length so that the salmon or trout which is being fed and washed with the pressurized fluid injected from the injector nozzles to automatically remove the internal organs and kidney attached to the inner walls of the body of the salmon or trout is prevented from running out from the conveyor belts.

2. Prior Art

In the canning or salting of salmon or trout, it is the common practice to cut the fish open in the belly for removing the internal organs and then to remove the kidney attached to the inner walls by hands, thus impeding a continuous and automatic operation of the canning or salting of the salmon or trout.

In order to overcome the disadvantage of the prior art, we have already developed a kidney-removing machine, now registered as Japanese Patent No. 814,853.

In this kidney-removing machine, however, the salmon or trout which has been cut open in the belly is passed to a kidney-removing member while placing the open side down, from which it is further passed between a pair of belts disposed at a distance in a horizontal direction. Thus, the salmon or trout is moved forward in a state of being held at the both sides between the belts, during which the kidney is removed by washing with pressurized water injected upwardly from a plurality of nozzles, so that the salmon or trout is apt to escape upwardly from the belts. Various attempts have been made to prevent the escapement but all ended in a failure. Thus, the kidney attached to the inner walls of the salmon or trout body can not be completely removed, requiring an additional labour for washing it again.

SUMMARY OF THE INVENTION

It is therefore an object of the present invention to provide a horizontal fish kidney-removing machine in which, after having cut open the belly of fishes such as salmon or trout, the fish is fed between a pair of upper and lower belts while placing the belly horizontally whereby the fish being washed is prevented from escaping upwardly, ensuring a stable feed of the fish.

It is another object of the present invention to provide a horizontal fish kidney-removing machine in which the fish can be processed which lying down on a conveyor belt, ensuring easy feed of the fish without requiring any troublesome operation of keeping the fish by hands.

It is a further object of the present invention to provide a horizontal fish kidney-removing machine which includes a pair of drive pulleys adapted to control the distance between the upper and lower feed belts depending on the size of fish, the pulleys being brought closer to or distant away from each other by turning a handle.

According to the present invention, there is provided a horizontal fish kidney-removing machine which comprises a pair of conveyor belts provided at a distance in a vertical direction, a kidney-removing member disposed between the pair of conveyor belts, the removing member being composed of two flat metal plates which are combined together by welding at both ends in boat-shaped forms each gradually diverging from the end to establish a space of a rectangular form at the central portion thereof, an inclining guide plate disposed upstream of the removing member and fixedly secured to one end of an induction plate, an injector element provided in the space of the rectangular form at the central portion of the removing member and including a plurality of nozzles, pairs of belt tension-adjusting units each provided at the central region of the space and adapted to have the belts tensioned further pairs of belt tension-adjusting units which are, respectively, disposed near a guide pulley and a drive pulley located at front and rear sides of the machine, and a keep-plate formed with a recessed portion at the center line along its length so that the salmon or trout which is being fed and washed with the pressurized fluid injected from the injector nozzles to automatically remove the internal organs and kidney attached to the inner walls of the body of the salmon or trout is prevented from running out or escaping from the conveyor belts.

BRIEF DESCRIPTION OF THE DRAWINGS

FIG. 6 is a perspective view of a keep plate;

FIG. 7 is a sectional view taken along the line A—A of FIG. 6; and

FIG. 8 is a perspective view showing a relation between a kidney-removing member and injector nozzles.

EMBODIMENTS OF THE INVENTION

Figure 1:
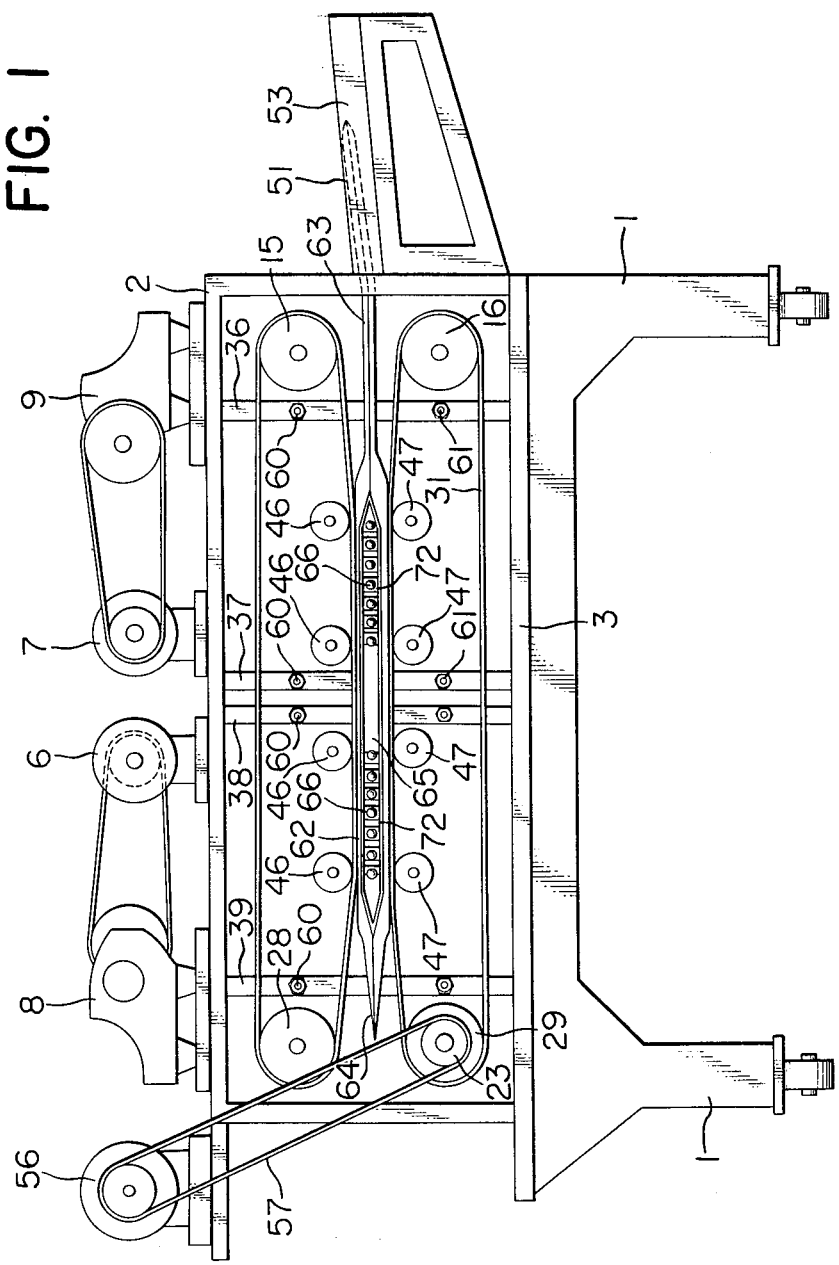
FIG. 1 is a plan view of a horizontal kidney-removing machine according to the present invention.
Figure 2:
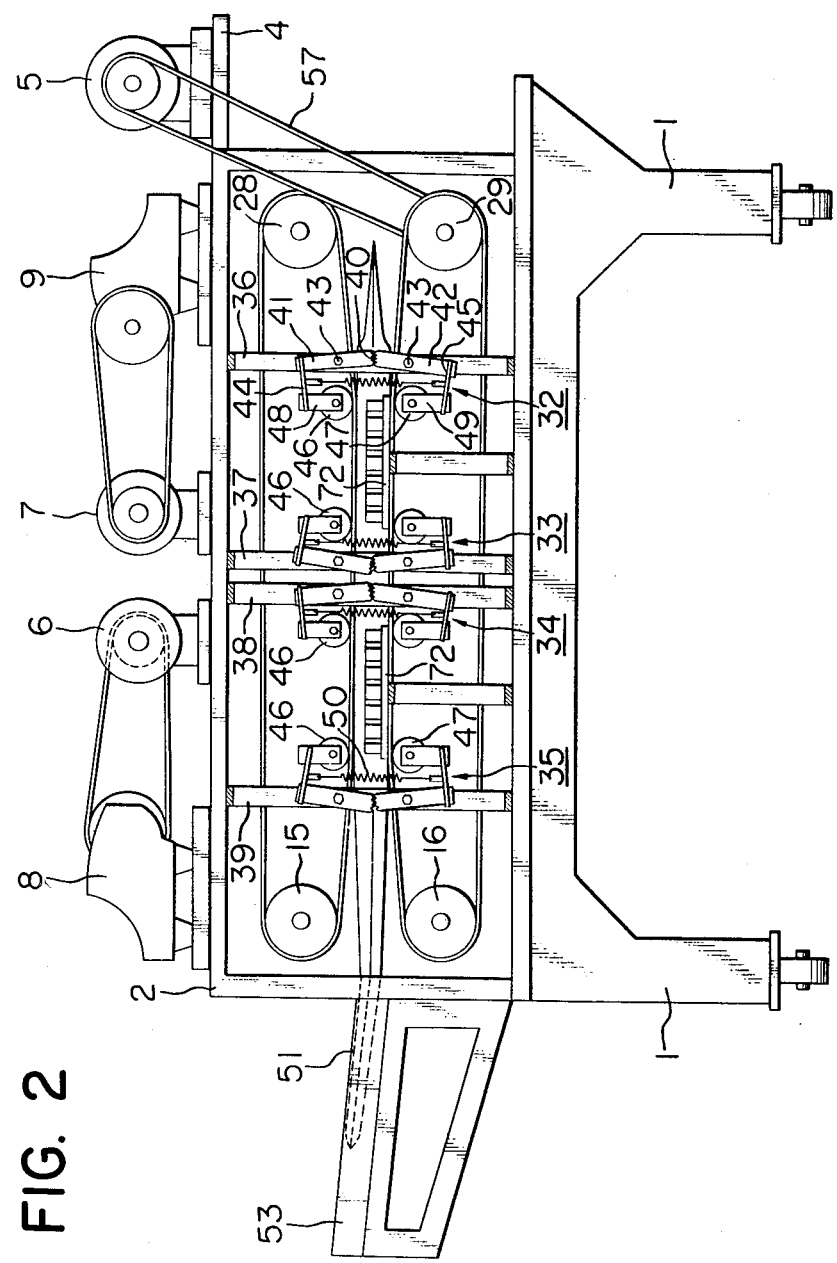
FIG. 2 is a rear view of the kidney-removing machine of the invention.
Figure 3:
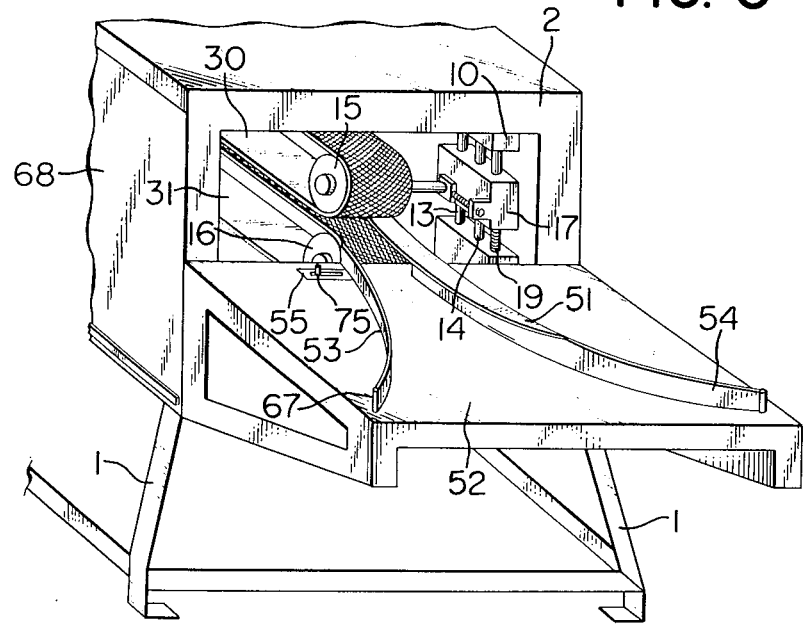
FIG. 3 is a perspective view of the machine as viewed from the inlet side.
Figure 4:
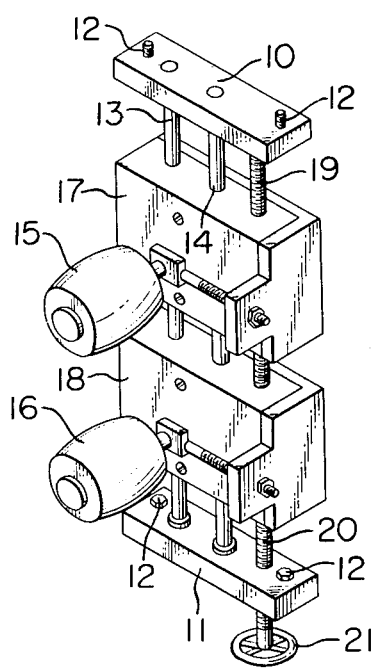
FIG. 4 is a perspective view of a device or unit for controlling a distance between the upper and lower guide pulleys of the machine of the invention.
Figure 5:
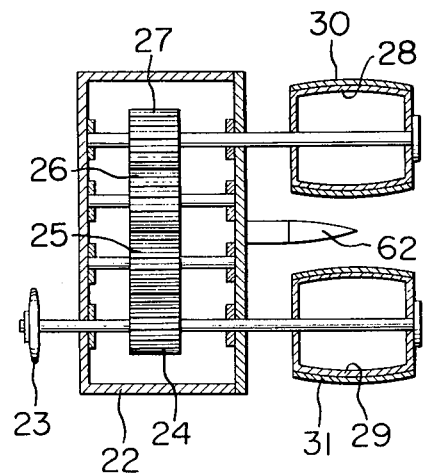
FIG. 5 is a sectional view of a drive pulley and a gear box of the machine of the invention.

An embodiment of the invention which can achieve the objects of the invention will be described with reference to the accompanying drawings.

In the figures, there are shown supports 1 which are welded with vertically standing frames 2 and a horizontal lower frame 3 to form a machine frame. On the upper portion of the machine frame is mounted a steel plate 4, on which motors 5, 6 and 7 and feed pumps 8 and 9 are mounted. The motors 6 and 7 are connected with the pumps 8 and 9 through endless V belts, respectively.

Indicated at 10 and 11 are retaining plates which are, respectively, fixed at the feed side of fish to the upper and lower frames 2 and 3 from the insides thereof by means of bolts 12. Between the retaining plates 10 and 11 are inserted and fixed guide bars 13 and 14, respectively. The guide bars 13 and 14 support pulley receivers 17 and 18 which in turn support guide pulleys 15 and 16 movably in vertical directions. The pulley receivers 17 and 18 are formed with a left hand female thread and a right hand female thread, respectively. The left hand and right hand female threads are incorporated with male threads 19 and 20, respectively.

At the lower end of the male thread is provided a handle 21.

A gear box 22 is mounted on the lower frame 3 at the side of discharging fish and includes a lower drive gear 24 fixed on the same axle as a chain wheel 24. The lower drive gear 24 is connected with an upper drive gear 27 through intermediate gears 25 and 26. Drive pulleys 28 and 29 are fixed to the upper and lower drive gears 27 and 24, respectively. The pulleys 28 and 29, respectively, include conveyor belts 30 and 31 each having an irregular outer surface. The conveyor belt 30 is put on the drive pulley 28 and the guide pulley 15 while the belt 31 is put on the drive pulley 29 and the guide pulley 16.

Indicated at 32–35 are belt tension-adjusting units which are disposed at predetermined distances between the drive pulleys 28 and 23 and also between the guide pulleys 15 and 16. The belt tension-adjusting units include retaining plates 36–39 of U forms each attached between the upper and lower frames 2 and 3. Each retaining plate is pivotally disposed with a pair of swinging plates 41 and 42, each having an arc-like gear 40 at one end through pins 43 and 43. The plates 41 and 42 are provided at the other end thereof with actuating rods 44 and 45, respectively. The rods 44 and 45 are fixed at their other end with brackets 48 and 49 rotatably supporting rollers 46 and 47, respectively.

A spring 50 is disposed between the actuating rods 44 and 45. Indicated at 51 is an inclining guide plate provided at a front side 63 of a kidney-removing member 62 which will be described in detail hereinlater.

Induction plates 53 and 54 are mounted on a table 52 located at the feed side (or inlet side). The side wall of the guide plate 51 is fixed to an upper end portion of the induction plate 54. At one side of the induction plate 54 or at the same side as of the guide pulley is provided an adjusting plate 55 having a slit through which a bolt 75 is movably inserted, by which the distance between the induction plates can be freely controlled depending on the size of fish being processed.

Indicated at 56 is a motor for driving the drive pulleys 23 and 28. The sprocket 23 is turned through a drive chain 57.

Support rods 60 and 61 are each fixed at one end thereof to the retaining plates 36–39 of U forms so that the upper and lower belts 30 and 31 are interposed therebetween and each formed with a male thread at the end. The support rods are secured through nuts to lugs 70, 70 . . . of a keep-plate 69, which is formed with a recess along its whole length so that the back of fish can be received while preventing escapement of the fish and the spinous dorsal fin is prevented from contacting with the plate 69.

The keep-plate 69 is formed at one end thereof with a curvature 73, ensuring easy reception of fish.

Indicated at 62 is a kidney-removing member, which is located in the space portion established between the upper and lower conveyor belts 30 and 31 which are wound around the guide pulleys 15 and 16 and the drive pulleys 23 and 28. The member 62 is supported on a support plate 73 which are secured to small-sized plates welded to the retaining plates 36, 37, 38 and 39 by means of bolts and nuts. The removing member 62 includes combined front and rear portions of boat-shaped forms in section, which diverge toward the center to establish a space 65 of a rectangular form.

Indicated at 66, 66 . . . are injector nozzles, which are attached to an injection element 72 located in the space 65 along the length of the removing member 62. From the nozzles is injected pressurized water which is fed from the feed pumps 8 and 9 through a pipe 74 and the injection element 72 formed with a conduit.

Indicated at 67 is a pin for securing the induction plate 53 at its one end, by which the induction plate 53 can be held swingingly about the pin. Indicated at 68 is a groove for retaining a shelter plate which is adapted to prevent water from being splashed outside the machine.

The shelter plate is freely removable and is made of a transparent material.

The operation of processing salmon or trout with the horizontal kidney-removing machine of the invention will be described.

A fish such as salmon or trout is cut open in the belly thereof to remove its internal organs therefrom. The fish is placed on the table 52 such that the guide plate 51 is inserted into the opened belly of the fish, under which condition the fish is forced into between the belts 30 and 31. Accordingly, the fish is forcingly moved forward in a state of being sandwiched between the belts 30 and 31, so that the opened belly is made wider by means of the front portion 63 of the boat-shaped form which is integrally incorporated with the guide plate 51, upon which highly pressurized water is injected against the opened belly from the injector nozzles 66, 66 . . . located in the central space 65 of the removing member 62 to remove the kidney from the inner walls and also to wash its surroundings.

The attached matter removed by the washing is pushed away and dropped from the side and the fish is moved forward by means of the belts and discharged from the rear portion 64.

Though the fish is pushed against one side by the action of the pressure of water injected from the nozzles when moved forward by means of the belts 30 and 31, it is moved in such a manner that its back is slidingly received in the recess 11 of the keep-plate 69 attached to the support rods 60 and 61. Accordingly, the escapement of fish from the upper and lower belts 30 and 31 can be satisfactorily prevented.

The control of distance between the induction plates 53 and 54 as required depending on the size of processing salmon or trout is feasible by loosing the bolt 75 which fixedly secures the adjusting plate 55 of the induction plate 53 so as to move the plate as substantially coinciding with the width of the fish lying horizontal (by swinging the plate 53 about the pin 67). Further, the distance between the guide pulleys 15 and 16 is varied correspondingly to the thickness of the fish by turning the handle 21 clockwise or counterclockwise, ensuring easy insertion of the fish.

The endless belts 30 and 31 which are positioned between the drive pulleys 23 and 28 and also guide pulleys 15 and 16 are invariably held constant in a distance therebetween by the pairs of belt tension-adjusting units 32–35 including the spring 50 and the rollers 46 and 47, so that the salmon or trout can be moved along the kidney-removing member 62 while being washed with water, thus completely preventing the escapement of the fish and improving an efficiency of processing the salmon or trout.

What is claimed is:

1. A horizontal kidney-removing machine comprising a pair of conveyor belts located at a distance in a vertical direction, a kidney-removing member disposed between the pair of conveyor belts, said member being composed of two flat metal plates which are combined together at both ends in boat-shaped forms each gradually diverging from the end to establish a space of a rectangular form at the central portion thereof, a guide plate for guiding the fish to be processed, said guide plate being fixedly secured to an induction plate on a table, an injection element located in the space of said removing machine and including a plurality of nozzles, pairs of belt tension-adjusting units provided at the central portion of the upper and lower conveyor belts, further pairs of belt tension-adjusting units located near a pair of guide pulleys located at the front portion of the machine and near a pair of drive pulleys located at the rear portion of the machine, respectively, and a keep plate disposed opposingly to the injector nozzles so that salmon or trout which is being fed and washed with pressurized fluid injected from the injector nozzles to automatically remove the internal organs and kidney attached to the inner walls of the body of salmon or trout is prevented from escaping from the conveyor belts.

2. A horizontal kidney-removing machine according to claim 1, wherein said guide plate integrally incorporated with the boat-shaped front portion of said removing member is inclined at an angle corresponding to the angle of inclination of the table and is fixedly secured at a side wall thereof to an upper end of one of a pair of induction plates mounted on the table.

3. A horizontal kidney-removing machine according to claim 1, wherein said keep plate is formed with a recessed portion along the whole length so as to avoid unnecessary contact of the spinous dorsal fin therewith and is curved at one end to ensure easy reception of salmon or trout.

* * * * *